US012688802B2

(12) United States Patent
Lee et al.

(10) Patent No.: US 12,688,802 B2
(45) Date of Patent: Jul. 21, 2026

(54) ELECTRONIC PAPER DISPLAY DEVICE AND FLEXIBLE SUBSTRATE FOR ELECTRONIC PAPER DISPLAY DEVICE HAVING FRAME

(71) Applicant: E Ink Holdings Inc., Hsinchu (TW)

(72) Inventors: Cheng-Hao Lee, Hsinchu (TW); Yung Sheng Chang, Hsinchu (TW); Wen-Chuan Wang, Hsinchu (TW); Ming-Huan Yang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 175 days.

(21) Appl. No.: 18/599,161

(22) Filed: Mar. 7, 2024

(65) Prior Publication Data

US 2024/0304119 A1 Sep. 12, 2024

(30) Foreign Application Priority Data

Mar. 8, 2023 (TW) ................................ 112108411

(51) Int. Cl.
*G09F 9/30* (2006.01)
*G09F 9/33* (2006.01)

(52) U.S. Cl.
CPC ................ *G09F 9/301* (2013.01); *G09F 9/33* (2013.01)

(58) Field of Classification Search
CPC .................................. G09F 9/301; G09F 9/33
USPC ....................... 345/174, 519; 257/40; 438/26
See application file for complete search history.

(56) References Cited

U.S. PATENT DOCUMENTS 9,635,467 B2 4/2017 Miyoshi et al.
10,534,399 B2 1/2020 Lee
2014/0183473 A1* 7/2014 Lee ....................... G06F 1/1641 257/40
2014/0264425 A1* 9/2014 Chida ................ H10D 86/0214 438/26
2016/0341997 A1* 11/2016 Fukushima ............ H10K 10/84
2019/0064562 A1* 2/2019 Nakui ....................... G09F 9/00
2019/0259309 A1* 8/2019 Scheidtmann .......... G09F 15/00
(Continued)

FOREIGN PATENT DOCUMENTS

CN 108243558 A 7/2018
CN 108700787 A 10/2018
(Continued)

OTHER PUBLICATIONS

The office action of corresponding TW application No. 112108411 issued on Sep. 25, 2024.

*Primary Examiner* — Prabodh M Dharia
(74) *Attorney, Agent, or Firm* — CKC & Partners Co., LLC

(57) ABSTRACT

An electronic paper display device includes a frame, a flexible substrate, a front panel, and a chip. The flexible substrate includes a first area, a second area, a bending area adjoining the first area and the second area, and a conductive glue disposing area. The first area and the conductive glue disposing area are located on the top surface of the frame. The flexible substrate has an L-shaped groove. When the bending area is bent through the L-shaped groove, the second area extends to the bottom surface of the frame. The front panel is located on the first area of the flexible substrate and has a conductive glue located in a non-display area. The conductive glue is located on the conductive glue disposing area of the flexible substrate. The chip is connected to the second area of the flexible substrate.

15 Claims, 7 Drawing Sheets

(56) References Cited

U.S. PATENT DOCUMENTS

| | | | | |
|---|---|---|---|---|
| 2020/0077508 | A1* | 3/2020 | Uogishi | H05K 3/28 |
| 2020/0154581 | A1* | 5/2020 | Chen | H05K 1/028 |
| 2021/0184162 | A1 | 6/2021 | Park | |
| 2021/0318586 | A1* | 10/2021 | Huang | G02F 1/16753 |
| 2022/0189349 | A1* | 6/2022 | Roh | B32B 15/08 |
| 2022/0199952 | A1* | 6/2022 | Jang | H10K 59/18 |

FOREIGN PATENT DOCUMENTS

| | | | |
|---|---|---|---|
| CN | 114639306 | A | 6/2022 |
| TW | 201921063 | A | 6/2019 |

* cited by examiner

150

150a

ELECTRONIC PAPER DISPLAY DEVICE AND FLEXIBLE SUBSTRATE FOR ELECTRONIC PAPER DISPLAY DEVICE HAVING FRAME

CROSS-REFERENCE TO RELATED APPLICATIONS

This application claims priority to Taiwan Application Serial Number 112108411, filed Mar. 8, 2023, which is herein incorporated by reference.

BACKGROUND

Field of Invention

The present disclosure relates to an electronic paper display device and a flexible substrate for the electronic paper display device having a frame.

Description of Related Art

Chip on plastic (COP) is an advanced packaging technology that connects a chip to a flexible substrate. A driving chip can be connected to the contact of the transparent electrode of a panel module by flip chip technology, and the flexible substrate can be bent such that a portion with the chip of the flexible substrate is located on the back side of a display area.

A flexible electronic paper display device adopting the above-mentioned COP technology can improve the problem that the width of the edge with the chip of the flexible substrate is too large. However, there are silver glue dots on the edge of an electronic paper module to electrically connect upper and lower electrodes, but the silver glue dots cannot be ben. The size and positions of the silver glue dots would affect circuit design, which further limits the decrease of the width of the edge with the chip of the flexible substrate by using COP technology for the electronic paper display.

SUMMARY

One aspect of the present disclosure provides an electronic paper display device.

According to some embodiments of the present disclosure, an electronic paper display device includes a frame, a flexible substrate, a front panel, and a chip. The flexible substrate includes a first area, a second area, a bending area adjoining the first area and the second area, and a conductive glue disposing area. The first area and the conductive glue disposing area are located on the top surface of the frame. The flexible substrate has an L-shaped groove. When the bending area is bent through the L-shaped groove, the second area extends to the bottom surface of the frame. The front panel is located on the first area of the flexible substrate and has a display area, a non-display area surrounding the display area, and a conductive glue located in the non-display area. The conductive glue is located on the conductive glue disposing area of the flexible substrate. The chip is connected to the second area of the flexible substrate.

In some embodiments, the L-shaped groove includes a horizontal portion and a vertical portion adjacent to the horizontal portion, the horizontal portion is located between the second area and the conductive glue disposing area, and the vertical portion is located between the bending area and the conductive glue disposing area.

In some embodiments, when the bending area is bent through the L-shaped groove, the horizontal portion of the L-shaped groove overlaps a bending central line of the bending area.

In some embodiments, the horizontal portion of the L-shaped groove is parallel to an edge of the front panel and extends to an edge of the flexible substrate, and the vertical portion of the L-shaped groove is perpendicular to the edge of the front panel.

In some embodiments, a length of the horizontal portion of the L-shaped groove is greater than a length of the vertical portion.

In some embodiments, the horizontal portion of the L-shaped groove extends along a direction perpendicular to a lengthwise direction of the flexible substrate, and the vertical portion of the L-shaped groove extends along the lengthwise direction of the flexible substrate.

In some embodiments, an end of the vertical portion of the L-shaped groove away from the horizontal portion has a chamfer.

In some embodiments, the end of the vertical portion of the L-shaped groove is round, U-shaped or drop-shaped.

In some embodiments, the electronic paper display device further includes a blocking element. The blocking element is located on an end of the vertical portion of the L-shaped groove away from the horizontal portion.

Another aspect of the present disclosure provides a flexible substrate for an electronic paper display device having a frame.

According to some embodiments of the present disclosure, a flexible substrate for an electronic paper display device having a frame includes a first area, a second area, a bending area, and a conductive glue disposing area. The bending area adjoins the first area and the second area. The first area and the conductive glue disposing area are located on a top surface of the frame, the flexible substrate has an L-shaped groove comprising a horizontal portion and a vertical portion that is adjacent to the horizontal portion, the horizontal portion is located between the second area and the conductive glue disposing area, the vertical portion is located between the bending area and the conductive glue disposing area. When the bending area is bent through the L-shaped groove, the second area extends to a bottom surface of the frame.

In some embodiments, when the bending area is bent through the L-shaped groove, the horizontal portion of the L-shaped groove overlaps a bending central line of the bending area.

In some embodiments, a length of the horizontal portion of the L-shaped groove is greater than a length of the vertical portion.

In some embodiments, an end of the vertical portion of the L-shaped groove away from the horizontal portion has a chamfer.

In some embodiments, the end of the vertical portion of the L-shaped groove is round, U-shaped or drop-shaped.

In some embodiments, the flexible substrate further includes a blocking element. The blocking element is located on an end of the vertical portion of the L-shaped groove away from the horizontal portion.

In the aforementioned embodiments of the present disclosure, the flexible substrate of the electronic paper display device has the L-shaped groove, and thus not only the second area can extend to the bottom surface of the frame when the bending area is bent through the L-shaped groove, but also the bending central line of the bending area can be further moved inward the display area in this state without being limited by the conductive glue on the flexible substrate. For example, the bending central line of the bending area is aligned with one side of the L-shaped groove. The L-shaped groove can bypass the conductive glue disposing area without affecting a circuit design connected to the front panel, such that the flexible substrate can be bent backwards to effectively reduce the frame width of the electronic paper display device (i.e., an edge on which the chip is disposed).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
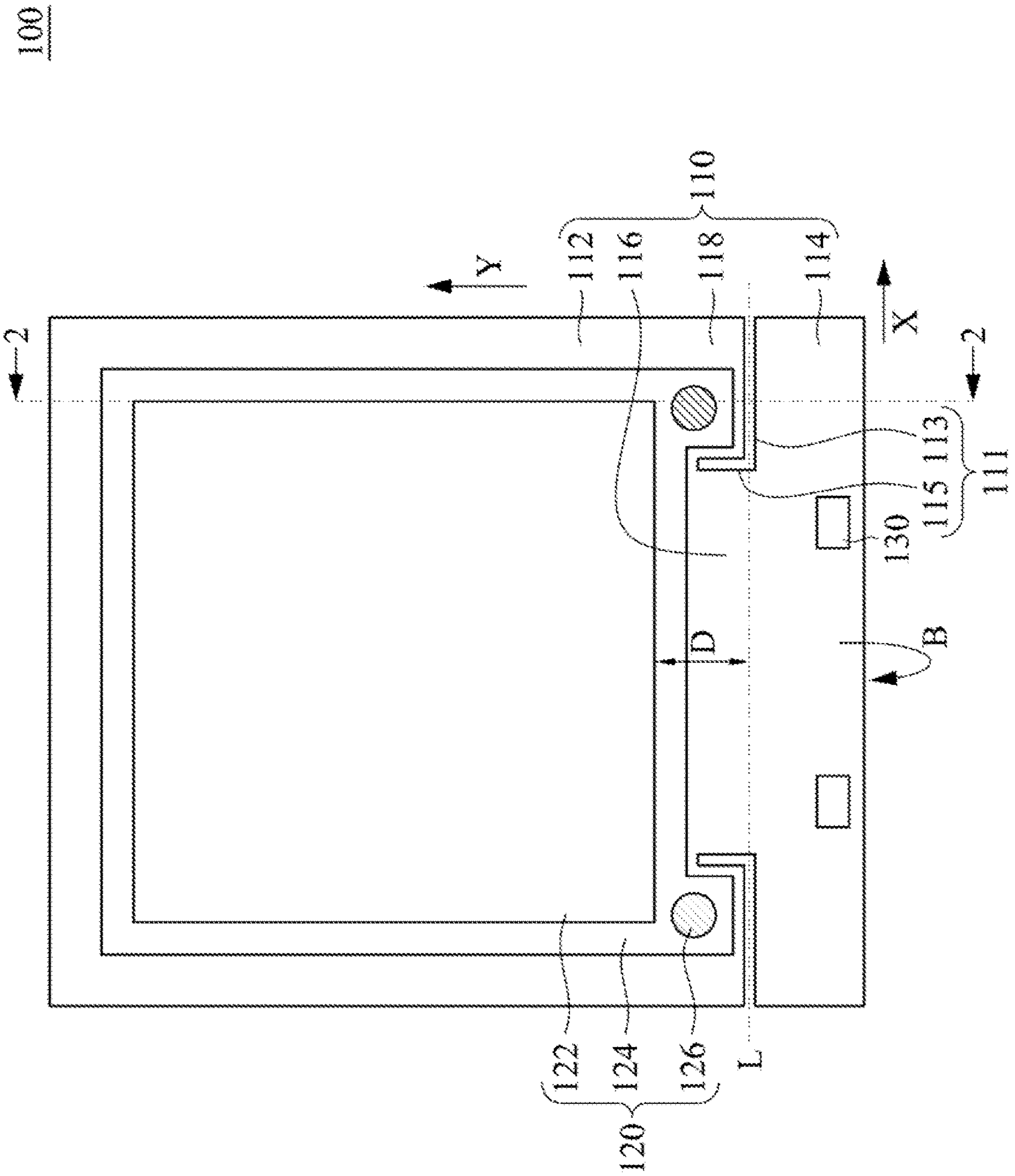
FIG. 1 is a top view of an electronic paper display device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2A:
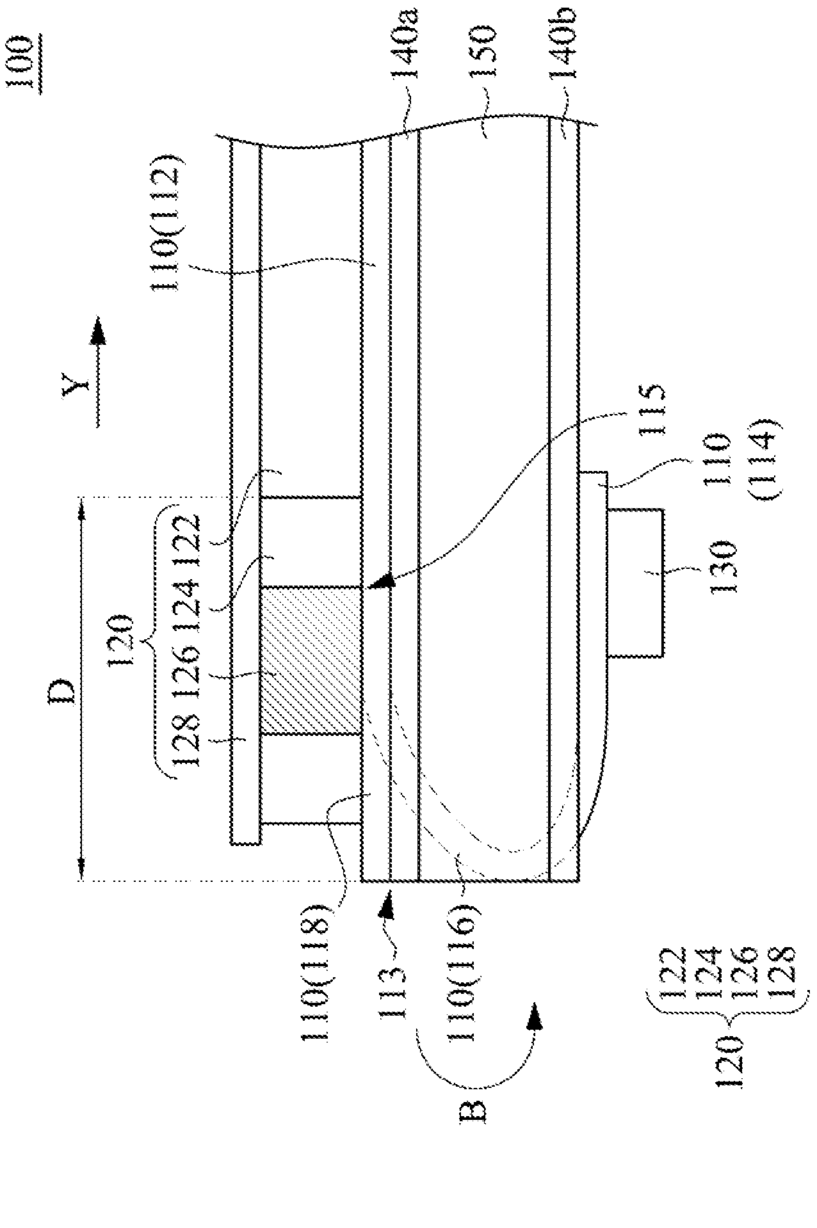
FIG. 2A is a cross-sectional schematic view of the electronic paper display device taken along line 2-2 of FIG. 1 after a flexible substrate is bent.

FIG. 1 is a top view of an electronic paper display device 100 according to one embodiment of the present disclosure. FIG. 2A is a cross-sectional schematic view of the electronic paper display device 100 taken along line 2-2 of FIG. 1 after a flexible substrate 110 is bent. As shown in FIG. 1 and FIG. 2A, the electronic paper display device 100 includes the flexible substrate 110, a front panel 120, a chip 130, and a frame 150 that is below the front panel 120 and the flexible substrate 110. The flexible substrate 110 includes a first area 112, a second area 114, a bending area 116, and a conductive glue disposing area 118. The bending area 116 of the flexible substrate 110 adjoins the first area 112 and the second area 114. The front panel 120 is located on the first area 112 of the flexible substrate 110, and the chip 130 is connected to the second area 114 of the flexible substrate 110. In FIG. 2A, the chip 130 is directly connected to the flexible substrate 110. In another embodiment, the chip 130 may be directly located on another substrate, and is electrically connected to the flexible substrate 110 through the another substrate. In addition, the flexible substrate 110 has an L-shaped groove 111. The bending area 116 of the flexible substrate 110 can be bent in a bending direction B through the L-shaped groove 111, such that the second area 114 of the flexible substrate 110 may extend to the bottom surface of the frame 150, as shown in FIG. 2A. Furthermore, the front panel 120 has a display area 122, a non-display area 124 surrounding the display area 122, and a conductive glue 126 located in the non-display area 124. The conductive glue 126 is located on the conductive glue disposing area 118 of the flexible substrate 110. The first area 112 and the conductive glue disposing area 118 of the flexible substrate 110 are located on the top surface of the frame 150.

In some embodiments, the L-shaped groove 111 bypassing the conductive glue 126 may be formed by laser cutting the flexible substrate 110. The material of the flexible substrate 110 includes, but not limited to polyimide (PI). The front panel 120 of the electronic paper display device 100 is a front panel laminate (FPL) which may include a front protection sheet 128, a top electrode (common electrode) on the bottom surface of the front protection sheet 128, and a display medium layer. For example, the display medium layer is an e-ink layer having microcapsules that correspond to the display area 122 in position. The portion of the first area 112 of the flexible substrate 110 overlapping the display area 122 has a thin film transistor (TFT) array and a bottom electrode (pixel electrode). The potential on the flexible substrate 110 can be transmitted to the top electrode via the conductive glue 126. The conductive glue 126 may be silver glue or the like. The conductive glue 126 is difficult to bend due to its material properties, and bending the conductive glue 126 by an external force may damage the aforementioned potential transmission. The chip 130 may be a driving chip which is capable of electrically connecting the TFT array through a conductive line on the flexible substrate 110.

Specifically, the flexible substrate 110 of the electronic paper display device 100 has the L-shaped groove 111, and thus not only the second area 114 of the flexible substrate 110 can extend to the bottom surface of the frame 150 when the bending area 116 of the flexible substrate 110 is bent in the bending direction B through the L-shaped groove 111, but also the bending central line of the bending area 116 can be further moved inward the display area 122 in this state without being limited by the conductive glue 126 on the flexible substrate 110. For example, the bending central line of the bending area 116 is aligned with one side of the L-shaped groove 111 (e.g., the lower side shown in FIG. 1). The L-shaped groove 111 can bypass the conductive glue disposing area 118 of the flexible substrate 110 without affecting a circuit design connected to the front panel 120, such that the flexible substrate 110 can be bent backwards to effectively reduce the frame width of the electronic paper display device 100 (i.e., an edge on which the chip 130 is disposed).

Figure 2B:
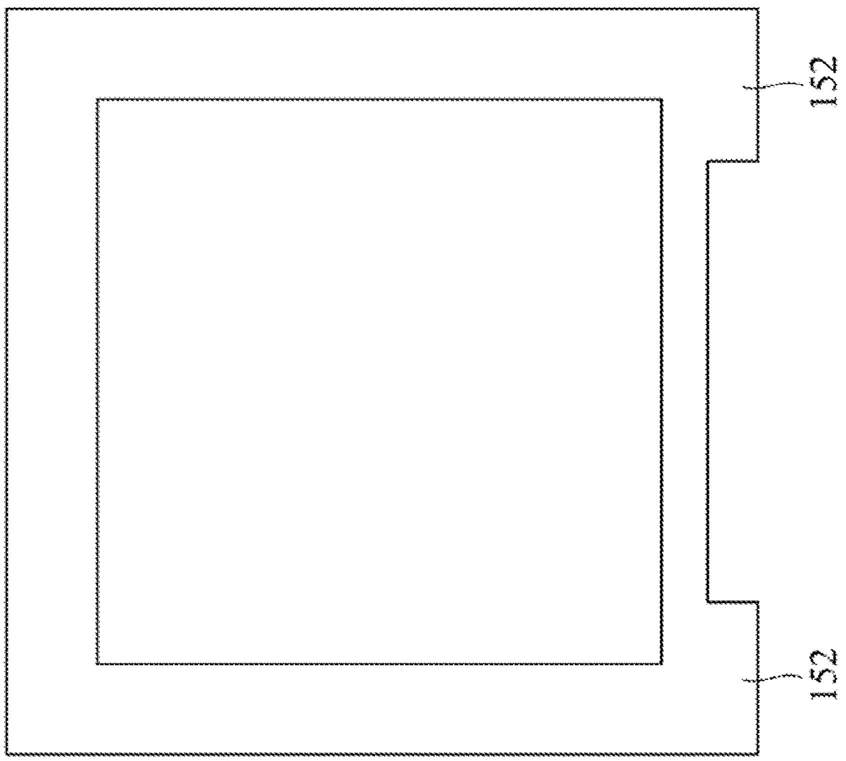
FIG. 2B is a top view of a frame of FIG. 2A.

FIG. 2B is a top view of the frame 150 of FIG. 2A. In this embodiment, the two corners of the frame 150 are convex design, such that the frame 150 has two convex portions 152. The position of the convex portion 152 corresponds to the position of the conductive glue disposing area 118 and the position of the conductive glue 126 shown in FIG. 1. Referring to FIG. 1 and FIG. 2A, there is an inverted T type portion between the two L-shaped grooves 111 before the flexible substrate 110 of FIG. 1 is bent. The inverted T type portion includes the bending area 116 and the second area 114. After the flexible substrate 110 is bent, the bending area 116 and the second area 114 may be located at a position above line L. For example, the line L acts as a bending central line of the bending area 116, in which there is a distance D between the line L and the display area 122. In this embodiment, the L-shaped groove 111 of the flexible substrate 110 includes a horizontal portion 113 and a vertical portion 115 adjacent to the horizontal portion 113. When the bending area 116 of the flexible substrate 110 is bent through the L-shaped groove 111, the horizontal portion 113 of the L-shaped groove 111 overlaps the bending central line (e.g., the line L) of the bending area 116 of the flexible substrate 110.

In this embodiment, the electronic paper display device 100 further includes two rear protection sheets 140*a* and 140*b*. The frame 150 is located between the rear protection sheets 140*a* and 140*b*. Moreover, the flexible substrate 110 is located on the rear protection sheet 140*a*, and the rear protection sheets 140*a* and 140*b* can protect the flexible substrate 110.

Figure 3:
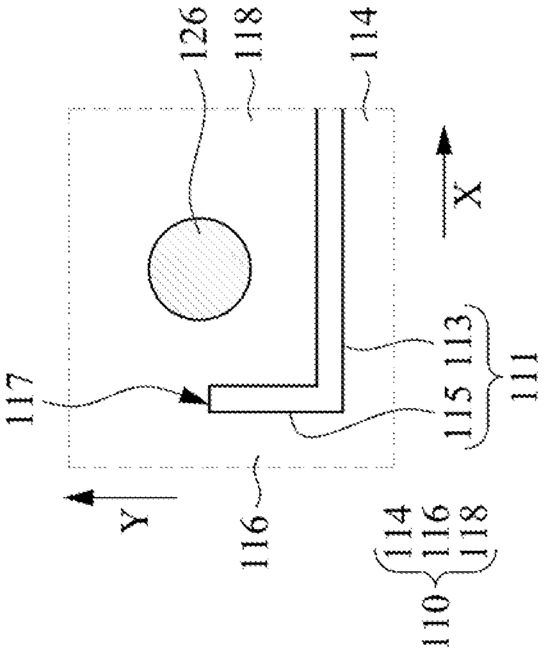
FIG. 3 is a partially enlarged view of an L-shaped groove of the flexible substrate of FIG. 1.

FIG. 3 is a partially enlarged view of an L-shaped groove 111 of the flexible substrate 110 of FIG. 1. As shown in FIG. 1 and FIG. 3, the horizontal portion 113 of the L-shaped groove 111 is located between the second area 114 and the conductive glue disposing area 118 of the flexible substrate 110, and the vertical portion 115 of the L-shaped groove 111 is located between the bending area 116 and the conductive glue disposing area 118 of the flexible substrate 110. The horizontal portion 113 of the L-shaped groove 111 is parallel to an edge (e.g., a lower edge) of the front panel 120 and extends to an edge (e.g., a right edge) of the flexible substrate 110. The vertical portion 115 of the L-shaped groove 111 is perpendicular to the edge (e.g., the lower edge) of the front panel 120. The length of the horizontal portion 113 of the L-shaped groove 111 is greater than the length of the vertical portion 115. The horizontal portion 113 of the L-shaped groove 111 extends along a direction X perpendicular to a lengthwise direction Y of the flexible substrate 110, and the vertical portion 115 of the L-shaped groove 111 extends along the lengthwise direction Y of the flexible substrate 110.

It is to be noted that the connection relationships, the materials, and the advantages of the elements described above will not be repeated in the following description. In the following description, other types of the L-shaped grooves 111 will be explained.

Figure 4:
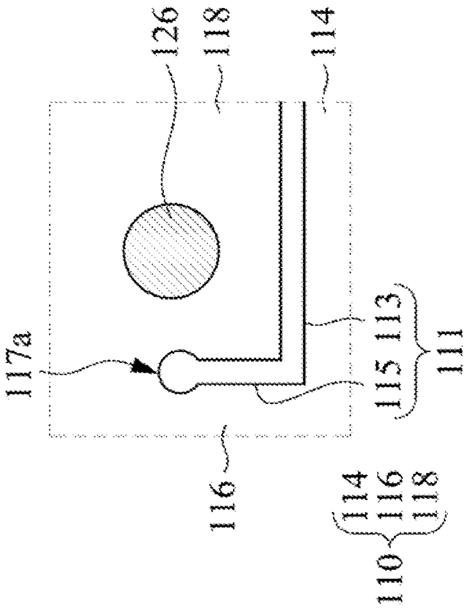
FIG. 4 is a partially enlarged view of an L-shaped groove of the flexible substrate according to another embodiment of the present disclosure.

FIG. 4 is a partially enlarged view of an L-shaped groove 111 of the flexible substrate 110 according to another embodiment of the present disclosure. The difference between this embodiment and the embodiment of FIG. 3 is that an end 117*a* of the vertical portion 115 of the L-shaped groove 111 of FIG. 4 away from the horizontal portion 113 has a chamfer. Furthermore, the end 117*a* of the vertical portion 115 of the L-shaped groove 111 of FIG. 4 is round. The end 117*a* of the L-shaped groove 111 with chamfer design can reduce stress damage during bending the flexible substrate 110, thereby preventing the flexible substrate 110 from being damaged due to stress concentration.

Figure 5:
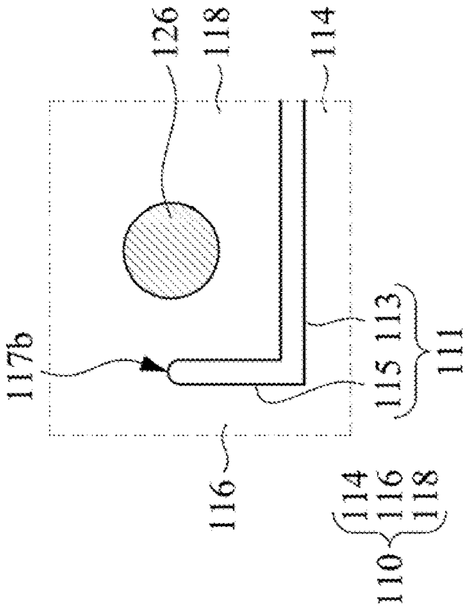
FIG. 5 is a partially enlarged view of an L-shaped groove of the flexible substrate according to still another embodiment of the present disclosure.

FIG. 5 is a partially enlarged view of an L-shaped groove 111 of the flexible substrate 110 according to still another embodiment of the present disclosure. The difference between this embodiment and the embodiment of FIG. 3 is that an end 117*b* of the vertical portion 115 of the L-shaped groove 111 of FIG. 5 away from the horizontal portion 113 has a chamfer. Furthermore, the end 117*b* of the vertical portion 115 of the L-shaped groove 111 of FIG. 5 is U-shaped. The end 117*b* of the L-shaped groove 111 with chamfer design can reduce stress damage during bending the flexible substrate 110, thereby preventing the flexible substrate 110 from being damaged due to stress concentration.

Figure 6:
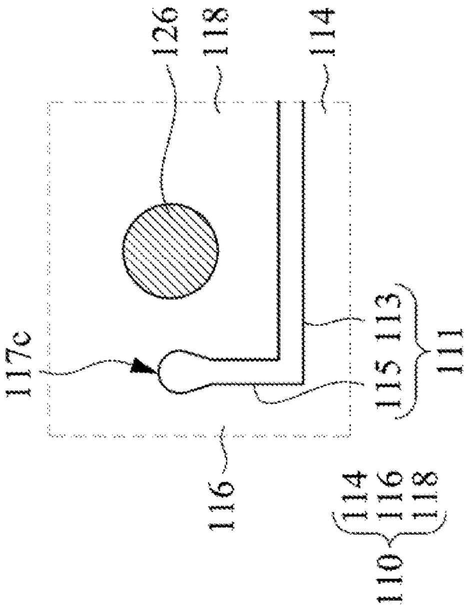
FIG. 6 is a partially enlarged view of an L-shaped groove of the flexible substrate according to yet another embodiment of the present disclosure.

FIG. 6 is a partially enlarged view of an L-shaped groove 111 of the flexible substrate 110 according to yet another embodiment of the present disclosure. The difference between this embodiment and the embodiment of FIG. 3 is that an end 117*c* of the vertical portion 115 of the L-shaped groove 111 of FIG. 5 away from the horizontal portion 113 has a chamfer. Furthermore, the end 117*c* of the vertical portion 115 of the L-shaped groove 111 of FIG. 6 is drop-shaped. The end 117*c* of the L-shaped groove 111 with chamfer design can reduce stress damage during bending the flexible substrate 110, thereby preventing the flexible substrate 110 from being damaged due to stress concentration.

Figure 7:
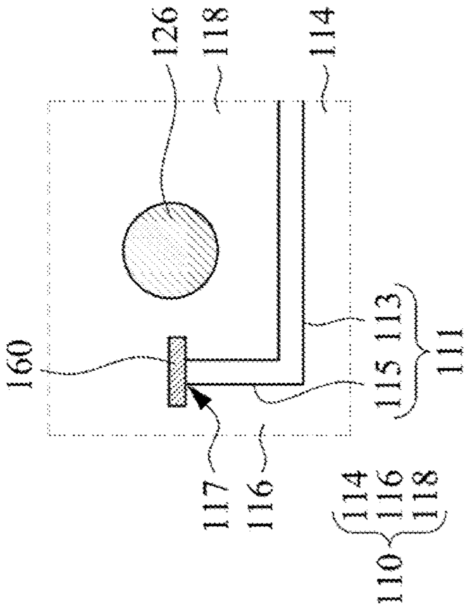
FIG. 7 is a partially enlarged view of an L-shaped groove of the flexible substrate according to one embodiment of the present disclosure.

FIG. 7 is a partially enlarged view of an L-shaped groove 111 of the flexible substrate 110 according to one embodiment of the present disclosure. The difference between this embodiment and the embodiment of FIG. 3 is that the electronic paper display device 100 (see FIG. 1) further includes a blocking element 160. The blocking element 160 is located on an end 117 of the vertical portion 115 of the L-shaped groove 111 away from the horizontal portion 113. The blocking element 160 may include stress barrier material, such as epoxy resin. The blocking element 160 may be manufactured by adhering, spraying, and transfer printing, and the present disclosure is not limited in this regard. The blocking element 160 can reduce stress damage during bending the flexible substrate 110.

Figure 8A:
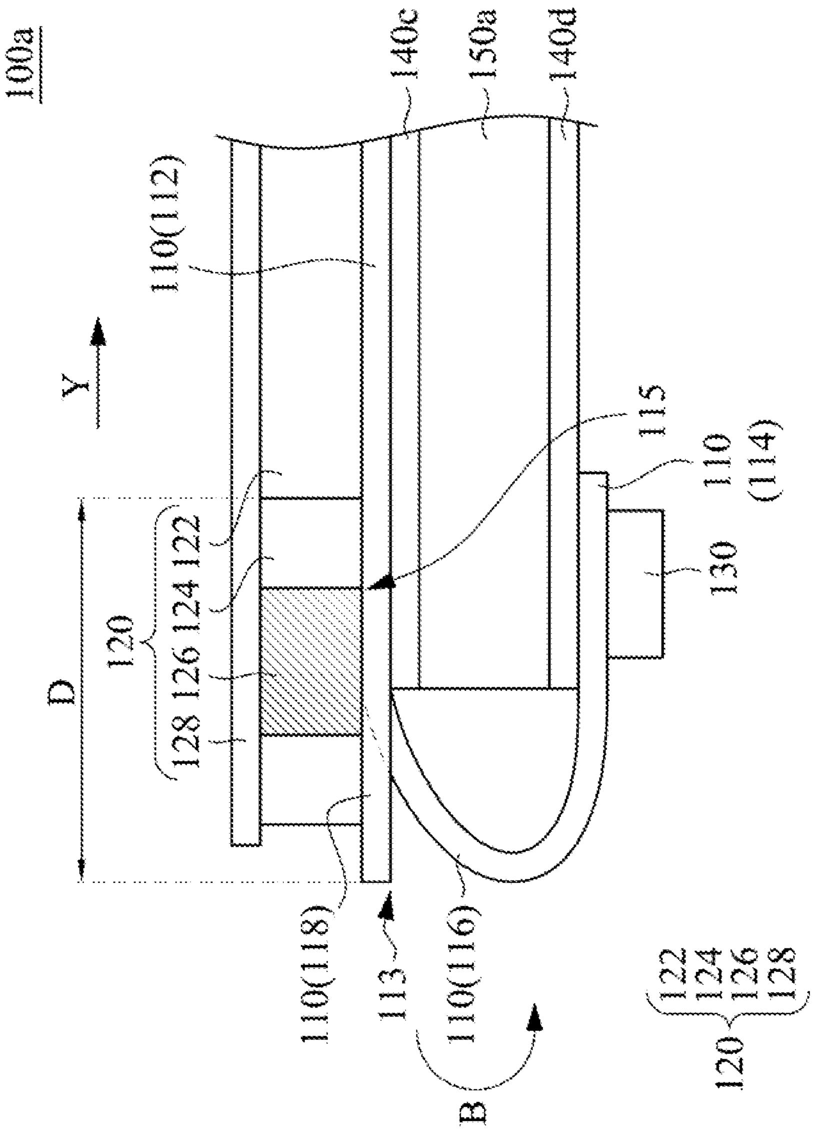
FIG. 8A is a cross-sectional schematic view of an electronic paper display device after a flexible substrate is bent according to another embodiment of the present disclosure.
Figure 8B:
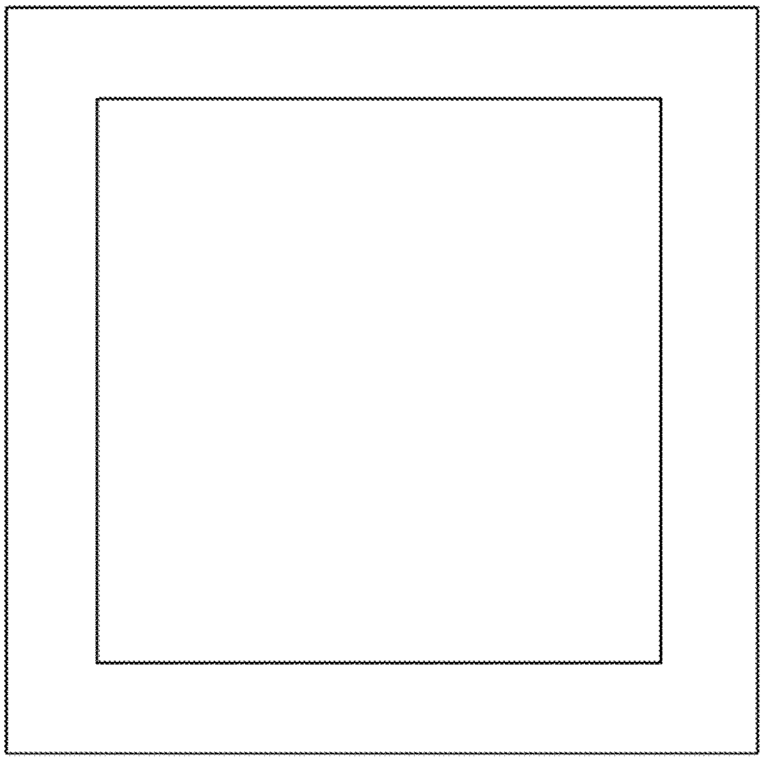
FIG. 8B is a top view of the frame of FIG. 8A.

FIG. 8A is a cross-sectional schematic view of an electronic paper display device 100*a* after the flexible substrate 110 is bent according to another embodiment of the present disclosure, in which the cross-sectional position of FIG. 8A is the same as that of FIG. 2A. FIG. 8B is a top view of a frame 150*a* of FIG. 8A. As shown in FIG. 8A and FIG. 8B, the electronic paper display device 100*a* includes the flexible substrate 110, the front panel 120, the chip 130, rear protection sheets 140*c* and 140*d*, and a frame 150*a*. The difference between this embodiment and the embodiment of FIGS. 2A and 2B is that the two corners of the frame 150*a* have no convex design, such that the outline of the frame 150*a* is rectangle without the two convex portions 152 of FIG. 2B. The frame 150*a* and the upper and lower rear protection sheets 140*c* and 140*d* may be recessed from the bending area 116 and the conductive glue disposing area 118 of the flexible substrate 110.

The designs of the L-shaped grooves 111 shown in FIGS. 4 to 7 can be applied to the above-mentioned electronic paper display devices 100 and 100*a*.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic paper display device, comprising:

a frame;

a flexible substrate comprising a first area, a second area, a bending area adjoining the first area and the second area, and a conductive glue disposing area, wherein the first area and the conductive glue disposing area are located on a top surface of the frame, and the flexible substrate viewed from above has an L-shaped groove and a lengthwise direction, and the L-shaped groove extends from an edge of the flexible substrate to an interior of the flexible substrate along a direction perpendicular to the lengthwise direction and then continuous along the lengthwise direction, wherein when the bending area is bent through the L-shaped groove, the second area extends to a bottom surface of the frame;

a front panel located on the first area of the flexible substrate, and having a display area, a non-display area surrounding the display area, and a conductive glue located in the non-display area, wherein the conductive glue is located on the conductive glue disposing area of the flexible substrate; and a chip connected to the second area of the flexible substrate.

2. The electronic paper display device of claim 1, wherein the L-shaped groove comprises a horizontal portion and a vertical portion adjacent to the horizontal portion, the horizontal portion is located between the second area and the conductive glue disposing area, and the vertical portion is located between the bending area and the conductive glue disposing area.

3. The electronic paper display device of claim 2, wherein when the bending area is bent through the L-shaped groove, the horizontal portion of the L-shaped groove overlaps a bending central line of the bending area.

4. The electronic paper display device of claim 2, wherein the horizontal portion of the L-shaped groove is parallel to an edge of the front panel and extends to the edge of the flexible substrate, and the vertical portion of the L-shaped groove is perpendicular to the edge of the front panel.

5. The electronic paper display device of claim 2, wherein a length of the horizontal portion of the L-shaped groove is greater than a length of the vertical portion.

6. The electronic paper display device of claim 2, wherein the horizontal portion of the L-shaped groove extends along a direction perpendicular to the lengthwise direction of the flexible substrate, and the vertical portion of the L-shaped groove extends along the lengthwise direction of the flexible substrate.

7. The electronic paper display device of claim 2, wherein an end of the vertical portion of the L-shaped groove away from the horizontal portion has a chamfer.

8. The electronic paper display device of claim 7, wherein the end of the vertical portion of the L-shaped groove is round, U-shaped or drop-shaped.

9. The electronic paper display device of claim 2, further comprising:

a blocking element located on an end of the vertical portion of the L-shaped groove away from the horizontal portion.

10. A flexible substrate for an electronic paper display device having a frame, comprising:

a first area;

a second area;

a bending area adjoining the first area and the second area; and a conductive glue disposing area, wherein the first area and the conductive glue disposing area are located on a top surface of the frame, the flexible substrate viewed from above has a lengthwise direction and an L-shaped groove comprising a horizontal portion and a vertical portion that is adjacent to the horizontal portion, the horizontal portion is located between the second area and the conductive glue disposing area, the vertical portion is located between the bending area and the conductive glue disposing area, and the L-shaped groove extends from an edge of the flexible substrate to an interior of the flexible substrate along a direction perpendicular to the lengthwise direction and then continuous along the lengthwise direction, wherein when the bending area is bent through the L-shaped groove, the second area extends to a bottom surface of the frame.

11. The flexible substrate of claim 10, wherein when the bending area is bent through the L-shaped groove, the horizontal portion of the L-shaped groove overlaps a bending central line of the bending area.

12. The flexible substrate of claim 10, wherein a length of the horizontal portion of the L-shaped groove is greater than a length of the vertical portion.

13. The flexible substrate of claim 10, wherein an end of the vertical portion of the L-shaped groove away from the horizontal portion has a chamfer.

14. The flexible substrate of claim 13, wherein the end of the vertical portion of the L-shaped groove is round, U-shaped or drop-shaped.

15. The flexible substrate of claim 10, further comprising:

a blocking element located on an end of the vertical portion of the L-shaped groove away from the horizontal portion.

* * * * *